United States Patent
Peng et al.

(10) Patent No.: US 8,427,824 B2
(45) Date of Patent: Apr. 23, 2013

(54) CARD MOUNTING APPARATUS

(75) Inventors: Wen-Tang Peng, Taipei Hsien (TW); Xin-Hu Gong, Shenzhen (CN); Si-Wen Shu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 403 days.

(21) Appl. No.: 12/910,851

(22) Filed: Oct. 24, 2010

(65) Prior Publication Data

US 2012/0014053 A1    Jan. 19, 2012

(30) Foreign Application Priority Data

Jul. 15, 2010  (CN) .......................... 2010 1 0227557

(51) Int. Cl.
*H05K 5/00* (2006.01)
*H05K 7/00* (2006.01)

(52) U.S. Cl.
USPC .............. 361/679.4; 361/679.44; 361/679.45; 361/679.58

(58) Field of Classification Search ............... 361/679.4, 361/679.58, 679.44, 679.45
See application file for complete search history.

(56) References Cited

U.S. PATENT DOCUMENTS

| | | | |
|---|---|---|---|
| 6,021,049 A * | 2/2000 | Thompson et al. | 361/759 |
| 6,288,911 B1 * | 9/2001 | Aoki et al. | 361/801 |
| 7,002,791 B2 * | 2/2006 | Diatzikis et al. | 361/679.4 |
| 7,120,028 B2 * | 10/2006 | Hsu | 361/726 |
| 7,898,797 B2 * | 3/2011 | Fan et al. | 361/679.4 |
| 2005/0052829 A1 * | 3/2005 | Diatzikis et al. | 361/679 |
| 2009/0129002 A1 * | 5/2009 | Wu et al. | 361/679.4 |
| 2011/0102994 A1 * | 5/2011 | Lu et al. | 361/679.4 |

* cited by examiner

*Primary Examiner* — Anthony Haughton
(74) *Attorney, Agent, or Firm* — Altis Law Group, Inc.

(57) ABSTRACT

An exemplary card mounting apparatus is for selectively mounting either of two different types of peripheral component interconnect (PCI) cards. The card mounting apparatus includes a bracket member, a receiving member, and a latch body. The bracket member defines an opening. The receiving member engages with the bracket member. The latch body hinges the bracket member and the receiving member. The receiving member is slidable relative to the bracket member, changing a length of the opening of the bracket member to allow the bracket member to receive different types of PCI card.

20 Claims, 9 Drawing Sheets

CARD MOUNTING APPARATUS

BACKGROUND

1. Technical Field

The present disclosure relates to card mounting apparatuses, and more particularly to a card mounting apparatus for different types of peripheral component interconnect (PCI) cards.

2. Description of Related Art

PCI cards often employ either a standard mounting apparatus or a low profile mounting apparatus, which connect two respective types of PCI cards known as standard PCI cards and low profile PCI cards. Each of the two types of mounting apparatuses defines a port for receiving the corresponding type of PCI card. However, the port of the standard mounting apparatus is larger than that of the low profile mounting apparatus. If a standard PCI card is to be replaced by a low profile PCI card or vice versa, the mounting apparatus must correspondingly be replaced. This is a time-consuming and costly requirement.

It is thus desirable to provide a card mounting apparatus which can overcome the described limitations.

DETAILED DESCRIPTION

Figure 1:
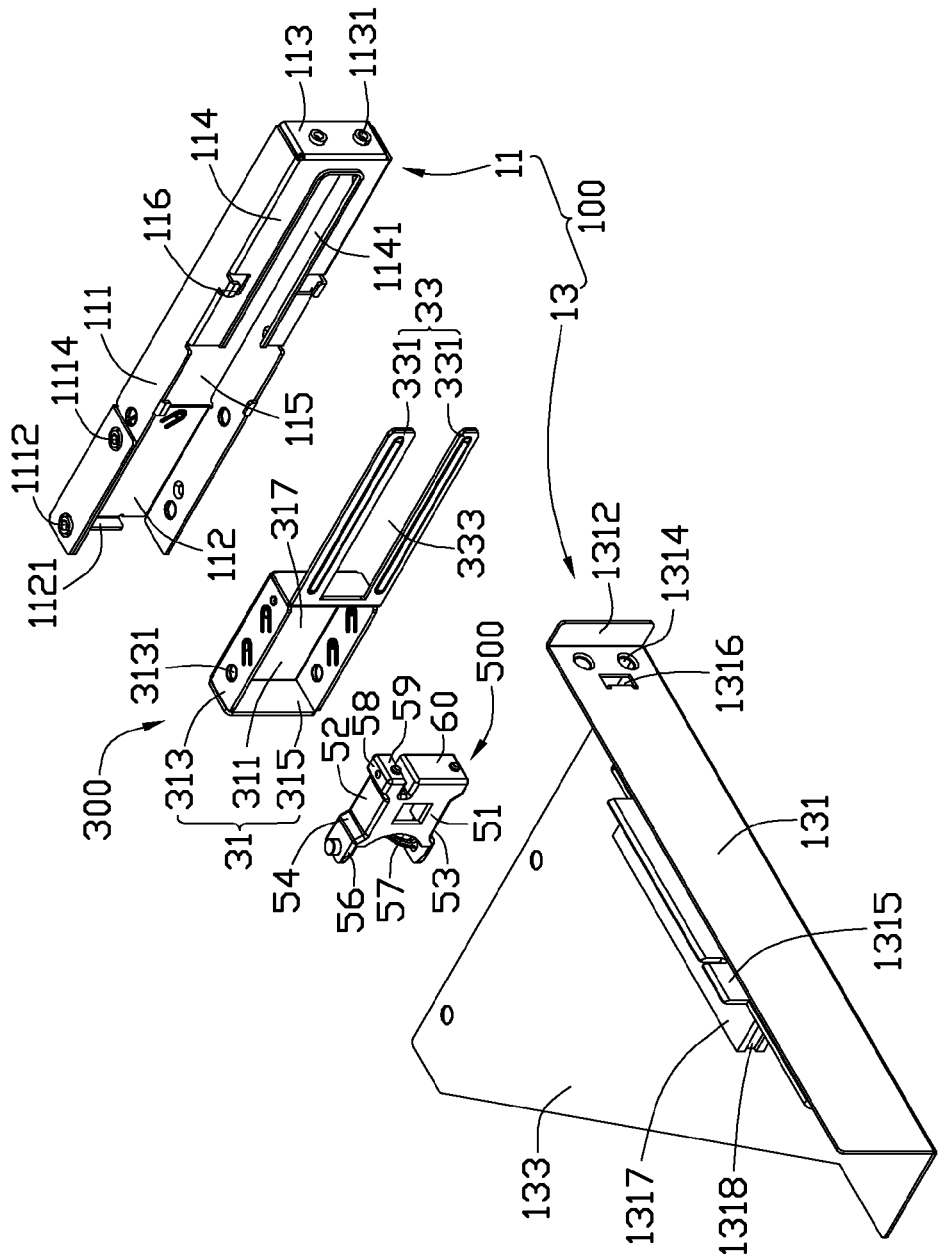
FIG. 1 is an exploded view of a card mounting apparatus according to an embodiment of the present disclosure.
Figure 2:
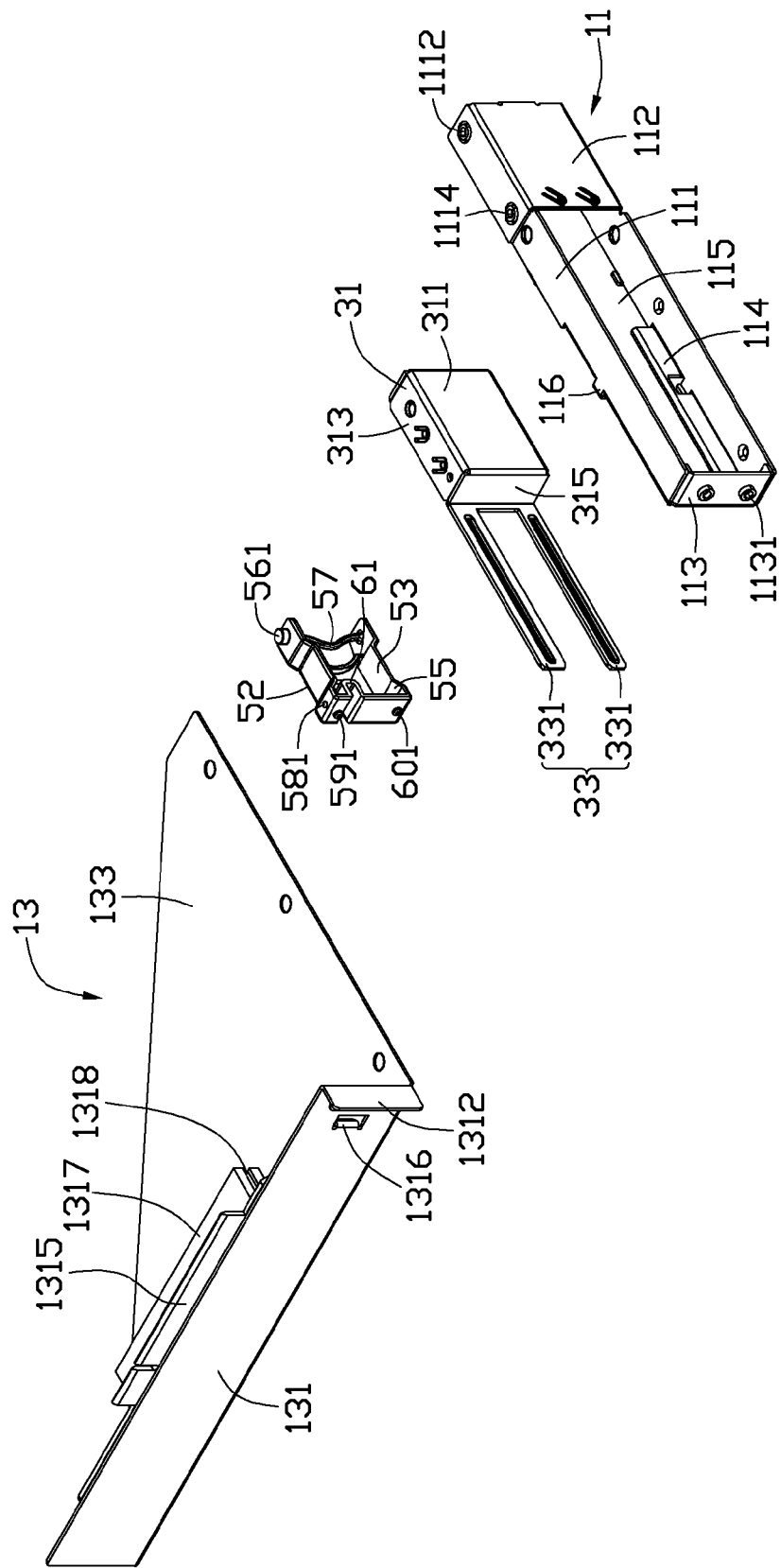
FIG. 2 is similar to FIG. 1, with the card mounting apparatus shown from another aspect.

Referring to FIGS. 1-2, a card mounting apparatus for different types of PCI cards is shown. The card mounting apparatus includes a bracket member 100, a receiving member 300, and a latch body 500. The receiving member 300 is mounted on the bracket member 100. The latch body 500 is received in the receiving member 300 and hinges on the bracket member 100 and the receiving member 300.

In the description that follows, the stated orientations of all of the elements of the card mounting apparatus of this disclosure accord with the orientations of all of the elements of FIG. 1.

The bracket member 100 includes a securing bracket 11 and a supporting bracket 13 fixed thereto. The securing bracket 11 includes a rectangular connecting plate 112 and two flanges 111. The two flanges 111 are elongated and parallel, facing and spaced from each other. A first through hole 1112 and a second through hole 1114 are defined in each of the flanges 111. The first through holes 1112 of the two flanges 111 are aligned with each other in a vertical direction, and the second through holes 1114 of the two flanges 111 are aligned with each other in a vertical direction. The first through hole 1112 is located at a left side of the second through hole 1114. The connecting plate 112 is located between the two flanges 111, with top and bottom edges of the connecting plate 112 adjoining front ends of left sides of the two flanges 111. A rectangular limiting plate 1121 extends rearwards from a left edge of the connecting plate 112 to baffle a left side of the receiving member 300.

A rectangular sidewall 113 is located between the two flanges 111, with top and bottom ends of the sidewall 113 adjoining rightmost edges of the two flanges 111. The sidewall 113 is located at a right side of the connecting plate 112 and is perpendicular to the connecting plate 112. Two protrusions 1131 extend outwardly from the sidewall 113, and are received in the supporting bracket 13. The two flanges 111, the connecting plate 112 and the sidewall 113 cooperatively define an opening 115. The opening 115 is rectangular.

A baffling plate 114 is located between the two flanges 111, and top and bottom edges of the baffling plate 114 adjoin rear ends of right sides of the two flanges 111. The baffling plate 114 is U-shaped, and a right end thereof adjoins the sidewall 113. The baffling plate 114 is shorter than the opening 115, such that a left end of the baffling plate 114 is located at a right side of a right end of the connecting plate 112 and spaced from the right end of the connecting plate 112. Thus, a left side of the opening 115 (the opening being at the front of the securing bracket 11) is not covered by the baffling plate 114 (the baffling plate 114 being at the rear of the securing bracket 11). A central portion of the baffling plate 114 is cut away to define a generally n-shaped slot 1141 in a right to left direction along the baffling plate 114. The n-shaped slot 1141 divides the baffling plate 114 into a top portion (not labeled) over the slot 1141 and a bottom portion (not labeled) under the slot 1141. The slot 1141 is aligned with a central portion of the right side of the opening 115. Two spaced clasps 116 are formed on a rear edge of each of the flanges 111, with each clasp 116 being oriented toward the other flange 111. On each flange 111, one of the clasps 116 is located at a rear side of the baffling plate 114 and is spaced from the baffling plate 114, and the other clasp 116 is located at the left of a left end of the baffling plate 114.

Figure 7:
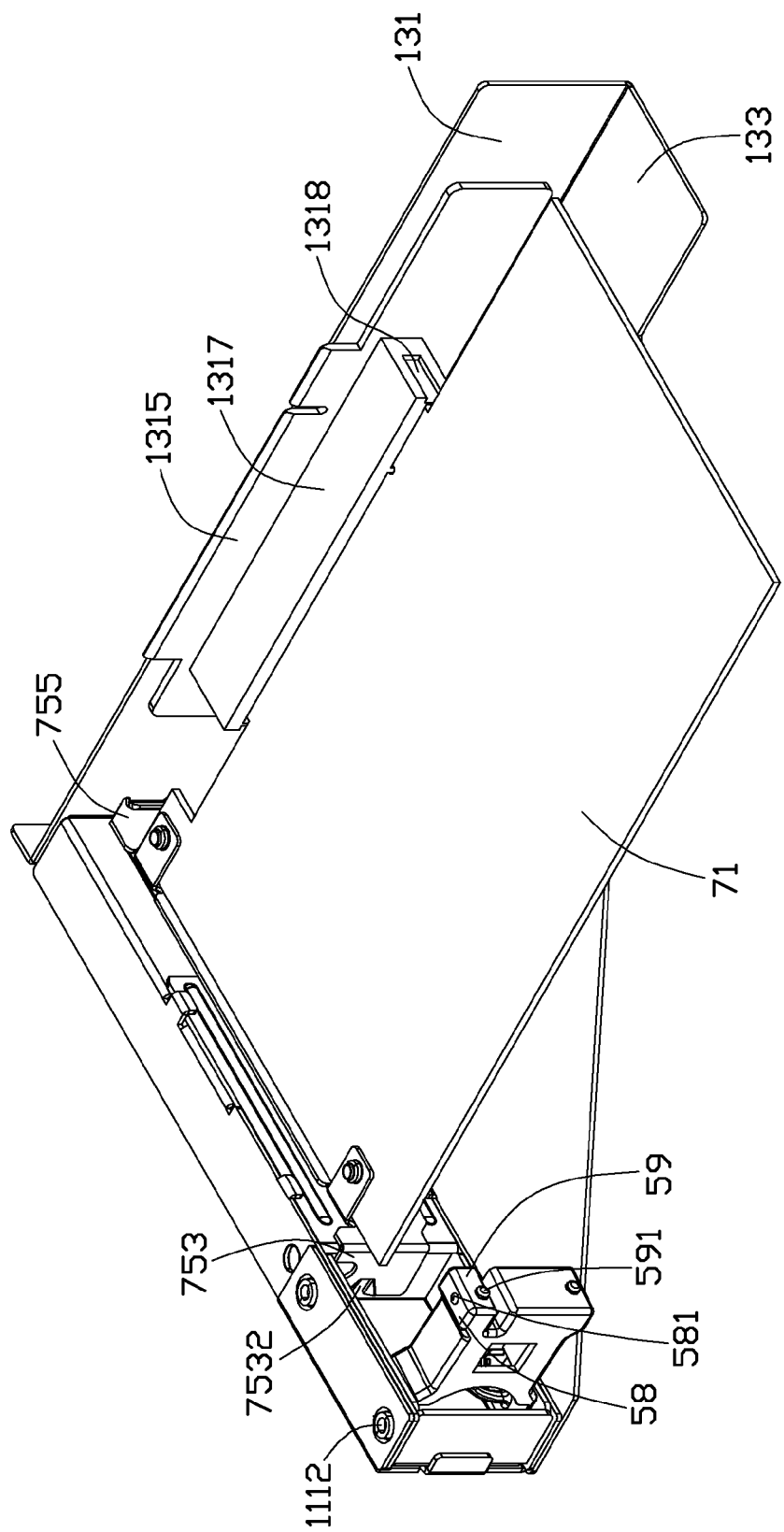
FIG. 7 is similar to FIG. 4, but showing the standard PCI card of FIG. 6 being mounted to the card mounting apparatus.

The supporting bracket 13 includes a first supporting plate 131 and a second supporting plate 133 extending from the first supporting plate 131. The first supporting plate 131 is elongated. A flange 1312 extends from a front end of the first supporting plate 131 to receive a cover (not shown) of a computer (not shown). Two mounting holes 1314 are defined in a front end of the first supporting plate 131. The mounting holes 1314 are aligned in a vertical direction, and receive the protrusions 1131 of the sidewall 113 of the securing bracket 11. A diameter of each mounting hole 1314 is approximately the same as or slightly less than a diameter of each protrusion 1131. A tab 1316 extends inwardly from an inner surface of the first supporting plate 131. A reinforced plate 1315 is secured on a central portion of the inner surface of the first supporting plate 131. A sustaining portion 1317 is secured on an inner surface of the reinforced plate 1315. The sustaining portion 1317 is a U-shaped plate. A through groove 1318 is defined in a center of the sustaining portion 1317 along a longitudinal axis of the sustaining portion 1317, to receive a PCI card therein (see FIG. 7).

The receiving member 300 includes a receiving portion 31, and an extending portion 33 extending from the receiving portion 31. The receiving portion 31 includes a front plate 311, two first side plates 313, and two second side plates 315. The front plate 311, the first side plates 313 and second side plates 315 each are rectangular. The first side plates 313 adjoin top and bottom edges of the front plate 311, respectively, and face each other. The second side plates 315 adjoin lateral edges of the front plate 311, respectively, and adjoin both the first side plates 313. The front plate 311, the first side plates 313, and the second side plates 315 cooperatively define a rectangular receiving chamber 317 therebetween, to receive the latch body 500 therein. A length of the front plate 311 is equal to that of the connecting plate 112 of the securing bracket 11, and exceeds a distance between the right end of the connecting plate 112 and the left end of the baffling plate 114. A height of the front plate 311 is slightly less than that of the connecting plate 112. Two spaced through holes 3131 are defined in each of the first side plates 313.

The extending portion 33 includes two strips 331. The two strips 331 extend from top and bottom ends of a rear edge of the right second side plate 315. The two strips 331 are spaced from each other. A gap 333 is defined between the two strips 331. The gap 333 is rectangular, and a horizontal length thereof is equal to that of the opening 115. The two strips 331 are sandwiched between the baffling plate 114 and the two clasps 116 located at the top and bottom portions of the baffling plate 114, respectively, when the receiving member 300 is mounted on the securing bracket 11. The strips 331 are slidable along the baffling plate 114. A length of each strip 331 exceeds a distance between the two clasps 116 at the top of the flange 111, and likewise exceeds a distance between the two clasps 116 at the bottom of the flange 111.

Figure 3:
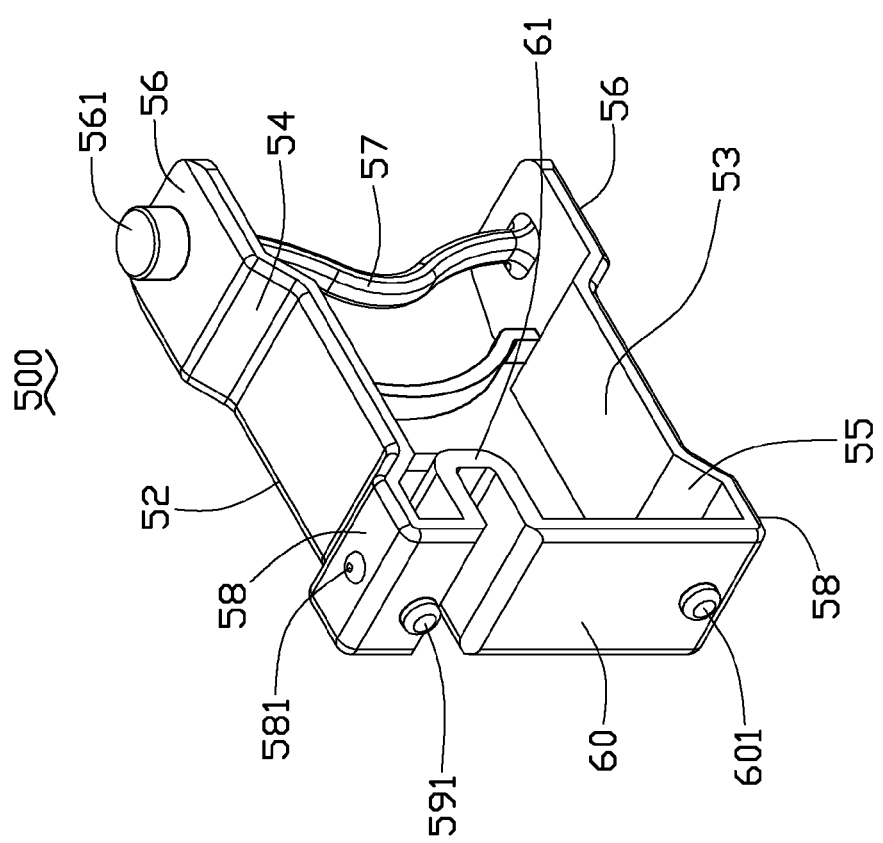
FIG. 3 is an enlarged view of a latch body of FIG. 2.

Referring also to FIG. 3, the latch body 500 is elastic and includes a joining plate 51. The joining plate 51 is rectangular. A top plate 52 and a bottom plate 53 extend forward from top and bottom edges of the joining plate 51, respectively. The top plate 52 and the bottom plate 53 are rectangular. Two rectangular first transition plates 54 extend upwardly and outwardly from lateral ends of the top plate 52, respectively. Two rectangular second transition plates 55 depend outwardly from lateral ends of the bottom plate 53, respectively. One first extending plate 56 extends leftwards from a top end of a left one of the first transition plates 54. The other first extending plate 56 extends leftwards from a bottom end of a left one of the second transition plates 55. The two first extending plates 56 are parallel to and face each other. A hinge pin 561 is formed on an outer surface of each of the first extending plates 56 to pivotably engage with both the securing bracket 11 and the receiving member 300.

An operating portion 57 is located between the first extending plates 56, and opposite ends of the operating portion 57 adjoin inner surfaces of the first extending plates 56, respectively. In this embodiment, the operating portion 57 is a bent strip. One second extending plate 58 extends rightwards from a top end of a right one of the first transition plates 54. The other second extending plate 58 extends rightwards from a bottom end of a right one of the second transition plates 55. The two second extending plates 58 are parallel to and face toward each other. The top first extending plate 56 and the top second extending plate 58 are coplanar. The bottom first extending plate 56 and the bottom second extending plate 58 are coplanar. A protruding nub 581 is formed on an outer surface of each of the second extending plates 58, to abut the first side plate 313 of the receiving portion 31 of the receiving member 300. An L-shaped third extending plate 59 is below the top second extending plate 58, and a top end of the third extending plate 59 adjoins right and rear ends of the top second extending plate 58. A first boss 591 protrudes from a right outer surface of the third extending plate 59. A fourth extending plate 60 extends forwards from a bottom portion of a right side of the joining plate 51, and a bottom end of the fourth extending plate 60 adjoins a right edge of the bottom second extending plate 58. The fourth extending plate 60 is coplanar with a right portion of the third extending plate 59. A second boss 601 protrudes from a bottom end of an outer surface of the fourth extending plate 60, and is aligned with the first boss 591 in a vertical direction. A top end of the fourth extending plate 60 and a bottom end of the third extending plate 59 are spaced from each other. A U-shaped connecting sheet 61 is located between and adjoins the third extending plate 59 and the fourth extending plate 60. A distance between the first extending plates 56 is equal to or less than that between the two first side plates 313.

Figure 4:
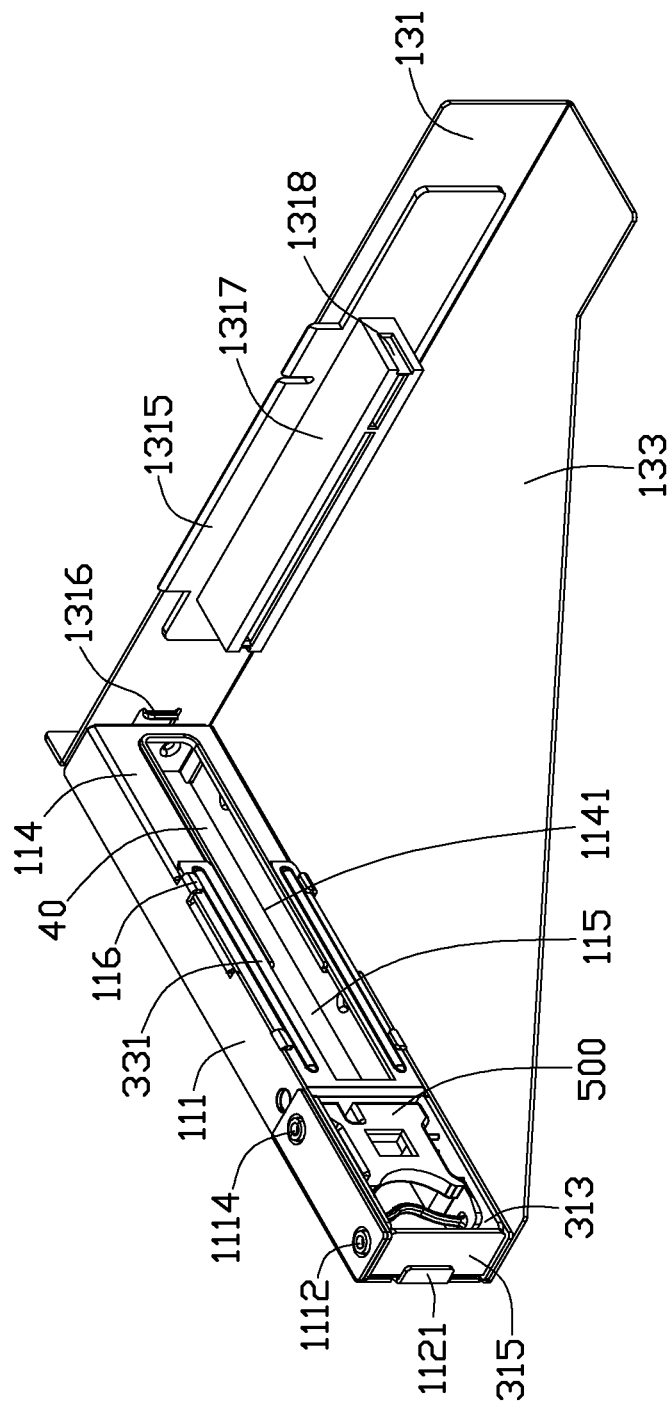
FIG. 4 is an isometric, assembled view of the card mounting apparatus of FIG. 1 when prepared for a standard PCI card.

Referring also to FIG. 4, when the card mounting apparatus is assembled, the securing bracket 11 is located at a left side of the first supporting plate 131 of the supporting bracket 13. The protrusions 1131 of the sidewall 113 of the securing bracket 11 are snugly received in the mounting holes 1314 of the first supporting plate 131. The second supporting plate 133 abuts a bottom portion of the securing bracket 11. The tab 1316 of the first supporting plate 131 is located at a rear side of the securing bracket 11. The two flanges 111 are pulled in opposite directions to separate the rear edges of the two flanges 111 further, and the receiving member 300 is impelled to enter the space between the rear edges of the flanges 111 and is thus put into position in the securing bracket 11. In this state, the left second side plate 315 abuts the limiting plate 1121 of the connecting plate 112 of the securing bracket 11. The right second side plate 315 aligns with the right end of the connecting plate 112. The front plate 311 abuts the connecting plate 112. The two strips 331 are sandwiched between the top and bottom portions of the baffling plate 114 and the clasps 116 located at the top and portions of the baffling plate 114, respectively. The strips 331 are slidable along the baffling plate 114. The through holes 3131 of the first side plates 313 of the receiving portion 31 of the receiving member 300 align with the first through holes 1112 of the flanges 111 of the securing bracket 11.

The operating portion 57 is manipulated to elastically deform the latch body 500 and thereby bring the two first extending plates 56 closer to each other. The latch body 500 is received in the receiving chamber 317 of the receiving portion 31 of the receiving member 300. The hinge pins 561 align with the through holes 3131. The operating portion 57 is released, and the hinge pins 561 extend through the through holes 3131 of the first side plates 313 and the first through holes 1112 of the flanges 111 to assemble the receiving member 300 and the bracket member 100 together. The protruding nubs 581 of the second extending plates 58 abut the first side plates 313 of the receiving portion 31 to maintain the latch body 500 in the receiving chamber 317. That is, the protruding nubs 581 prevent the latch body 500 from rotating easily about the hinge pins 561. In this state, the slot 1141 of the baffling plate 114 communicates with a left side of the gap 333 between the strips 331 of the extending portion 33 and cooperatively defines a rectangular standard port 40. The standard port 40 is suitable for a standard PCI card 70 (see FIG. 7). The standard port 40 and the opening 115 are located at the opposite rear and front sides of the securing bracket 11, respectively. The standard port 40 faces a middle portion of the opening 115. A width of the standard port 40 is substantially equal to that of the opening 115. A height of the standard port 40 is slightly less than that of the opening 115. In this state, the card mounting apparatus functions as a standard card mounting apparatus.

Figure 5:
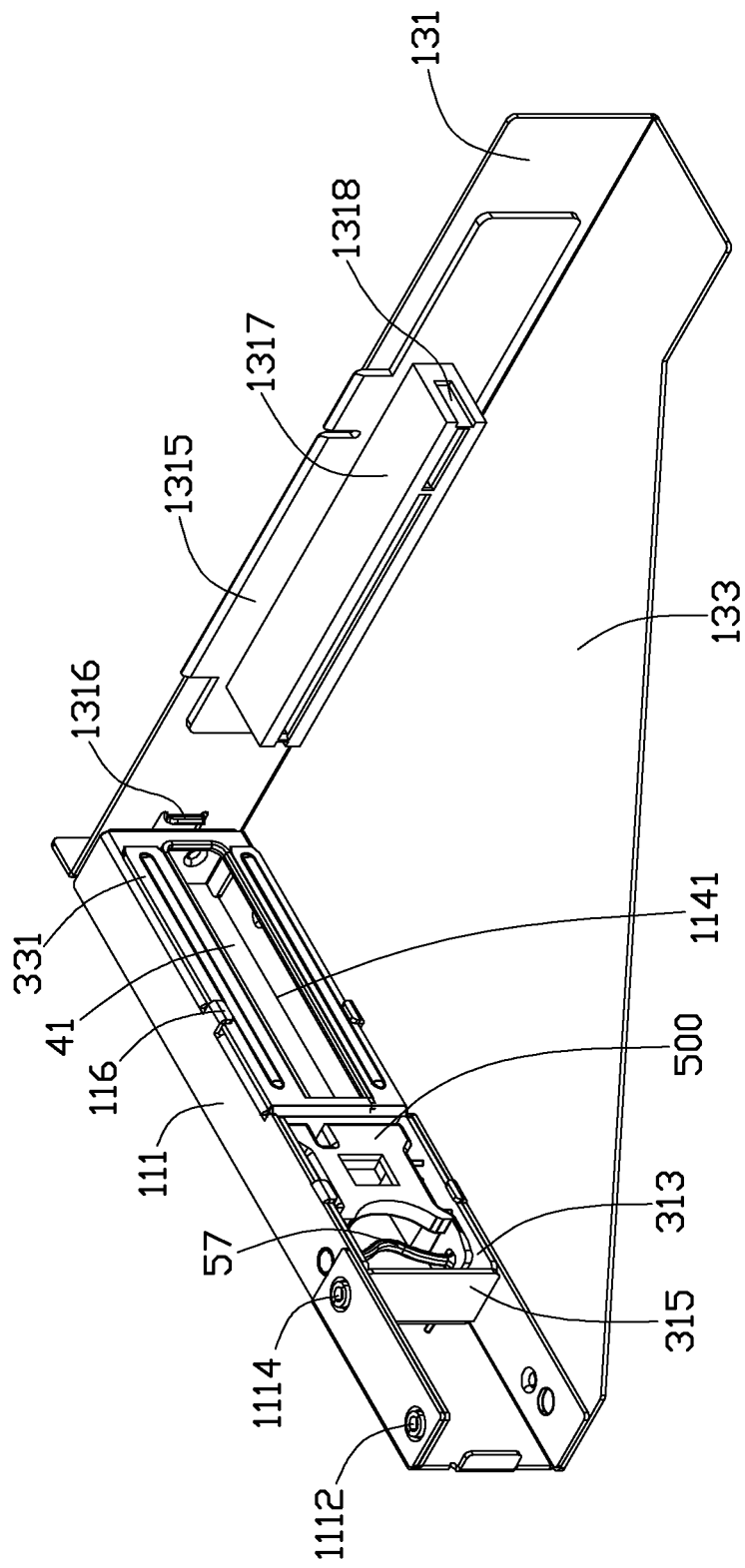
FIG. 5 is an isometric, assembled view of the card mounting apparatus of FIG. 1 when prepared for a low profile PCI card.

Referring also to FIG. 5, when the latch body 500 is elastically deformed by manipulating the operating portion 57, the hinge pins 561 depart from the first through holes 1121 of the flanges 111 and the through holes 3131 of the first side plates 313. Accordingly, the operating portion 57 is moved rightwards and drives the receiving member 300 to slide along the longitudinal axis of the flange 111 until the right second side plate 315 encounters the left end of the baffling plate 114. Then, the operating portion 57 is released, and the hinge pins 561 extend through the through holes 3131 of the first side plates 313 and the second through holes 1114 of the flanges 111, whereby the receiving member 300 and the bracket member 100 are once again attached together. In this state, the strips 331 fully abut the top and bottom portions of the baffling plate 114, and are sandwiched between the top and bottom portions of the baffling plate 114 and the two clasps 116 located at the top and bottom portions of the baffling plate 114, respectively. Thus, the slot 1141 of the baffling plate 114 defines a low profile port 41. A horizontal length of the low profile port 41 is less than that of the standard port 40, and the low profile port 41 is suitable for receiving a low profile PCI card 80 (see FIG. 9). In this state, the card mounting apparatus functions as a low profile card mounting apparatus.

Figure 6:
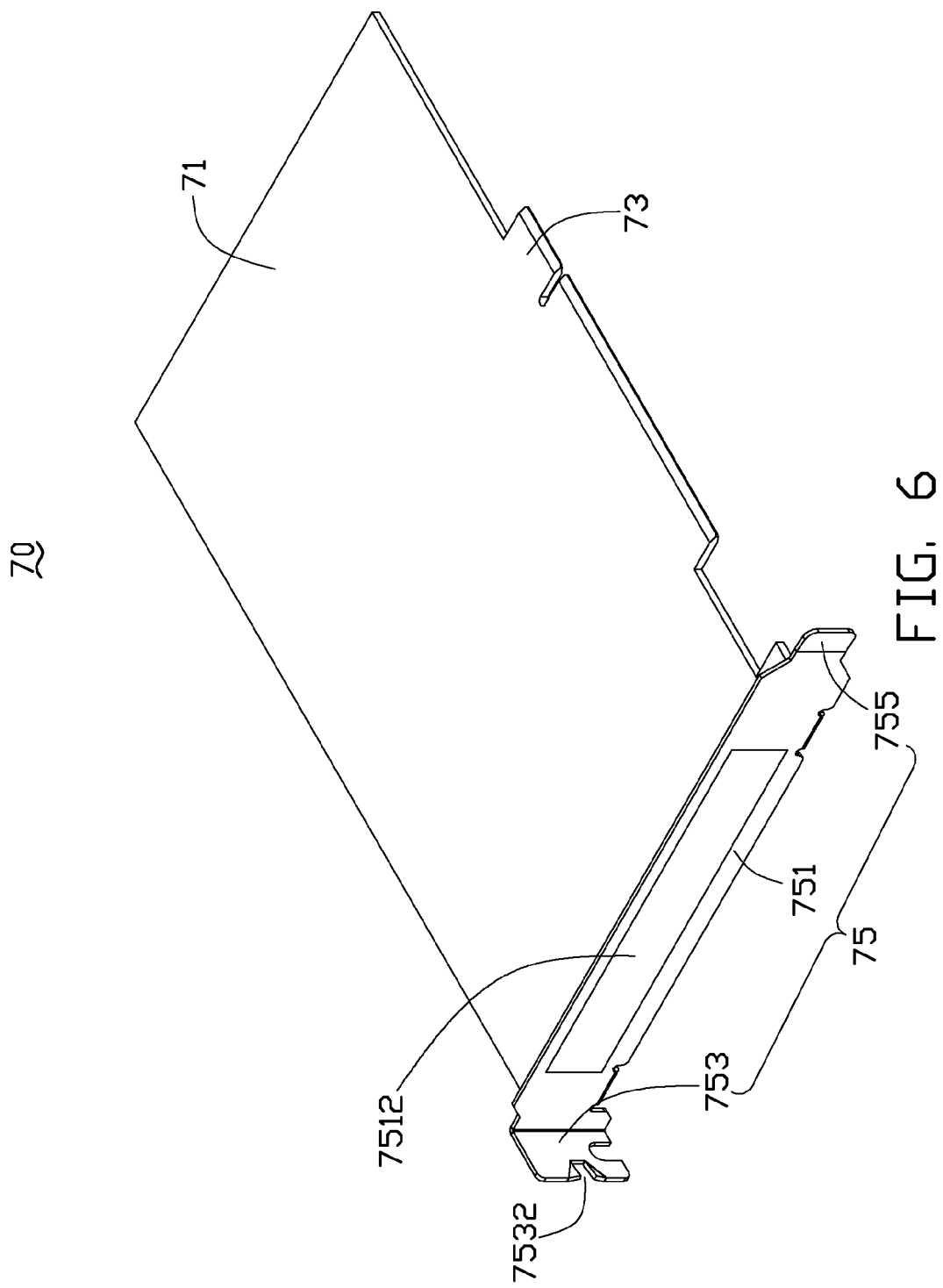
FIG. 6 is an isometric view of a standard PCI card, showing the standard PCI card inverted.

Referring to FIG. 6, the standard PCI card 70 includes a main body 71 and a slot cover 75. The main body 71 is approximately rectangular, and includes an extension portion 73. The extension portion 73 is elongated, and extends from a central portion of a long side of the main body 71. The slot cover 75 is in the form of a bent plate, and includes an elongated main plate 751, a bent plate 753 and a nose plate 755. The main plate 751 is attached (e.g. adhered) on a short side of the main body 71, and is thus perpendicular to the extension portion 73. A rectangular opening 7512 is defined in a central portion of the main plate 751 to receive a peripheral component (not shown). A size of the opening 7512 is substantially equal to that of the standard port 40 of the standard card mounting apparatus. The bent plate 753 is generally rectangular, and extends perpendicularly forward from a left end of the main plate 751 (as viewed in FIG. 6). That is, the bent plate 753 is integrally formed with the main plate 751, and is perpendicular to the main plate 751. A generally n-shaped groove 7532 is defined in a middle of a front edge of the bent plate 753. The nose plate 755 extends from a right end of the main plate 751 (as viewed in FIG. 6), and is bent slightly forward from the plane of the main plate 751. A height of the nose plate 755 is less than that of the main plate 751.

Referring to FIGS. 4-7, when the standard PCI card 70 is assembled to the standard card mounting apparatus, the latch body 500 is swung out from the receiving chamber 317 of the receiving member 300 on the hinge pins 561 of the latch body 500. The extension portion 73 of the standard PCI card 70 is received in the through groove 1318 of the sustaining portion 1317 of the supporting plate 131 of the supporting bracket 13. The bent plate 753 of the slot cover 75 is received in the receiving chamber 317 and abuts the right second side plate 315. The nose plate 755 of the slot cover 75 is bent towards the tab 1316. A top of the nose plate 755 is bent backward and abuts a top end of the tab 1316. The latch body 500 is rotated relative to the hinge pins 561 to be received in the receiving member 317. The first boss 591 of the third extending plate 59 is received in the groove 7532 of the bent plate 753 and abuts the bent plate 753. The protruding nubs 581 of the second extending plates 58 abut the first side plates 313 of the receiving portion 31. In this state, the standard PCI card 70 is mounted on the standard card mounting apparatus. The opening 7512 of the main plate 751 aligns with the opening 115 of the securing bracket 11 of the bracket member 100. The peripheral component suitable for the standard PCI card 70 extends through the opening 115 and the opening 7512 and connects with the standard PCI card 70.

Figure 8:
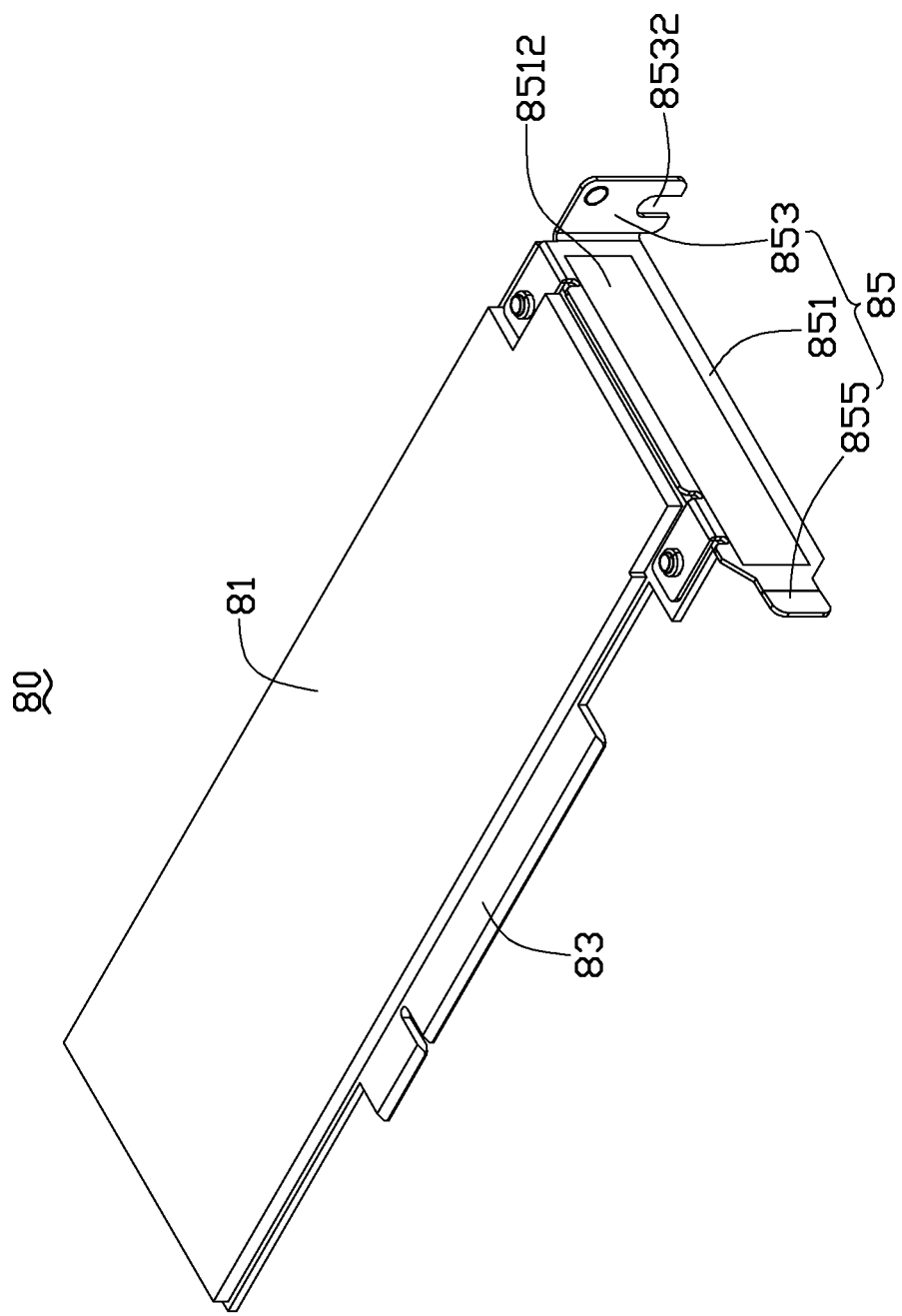
FIG. 8 is an isometric view of a low profile PCI card.

Referring to FIG. 8, the low profile PCI card 80 differs from the standard PCI card 70 in that the main body 81 is narrower than the main body 71 of the standard PCI card 70. An extension portion 83 is elongated, and extends from a long side of the main body 81. The slot cover 85 includes an elongated main plate 851, a bent plate 853 and a nose plate 855. The bent plate 853 is shorter than the bent plate 753 of the slot cover 75 of the standard PCI card 70. A rectangular opening 8512 is defined in a central portion of the main plate 851. A size of the opening 8512 is equal to that of the low profile port 41 of the card mounting apparatus. The bent plate 853 is rectangular, is integrally formed with the main plate 851, and is perpendicular to the main plate 851. The bent plate 853 has a generally n-shaped groove 8532 defined in a central portion of a bottom end thereof.

Figure 9:
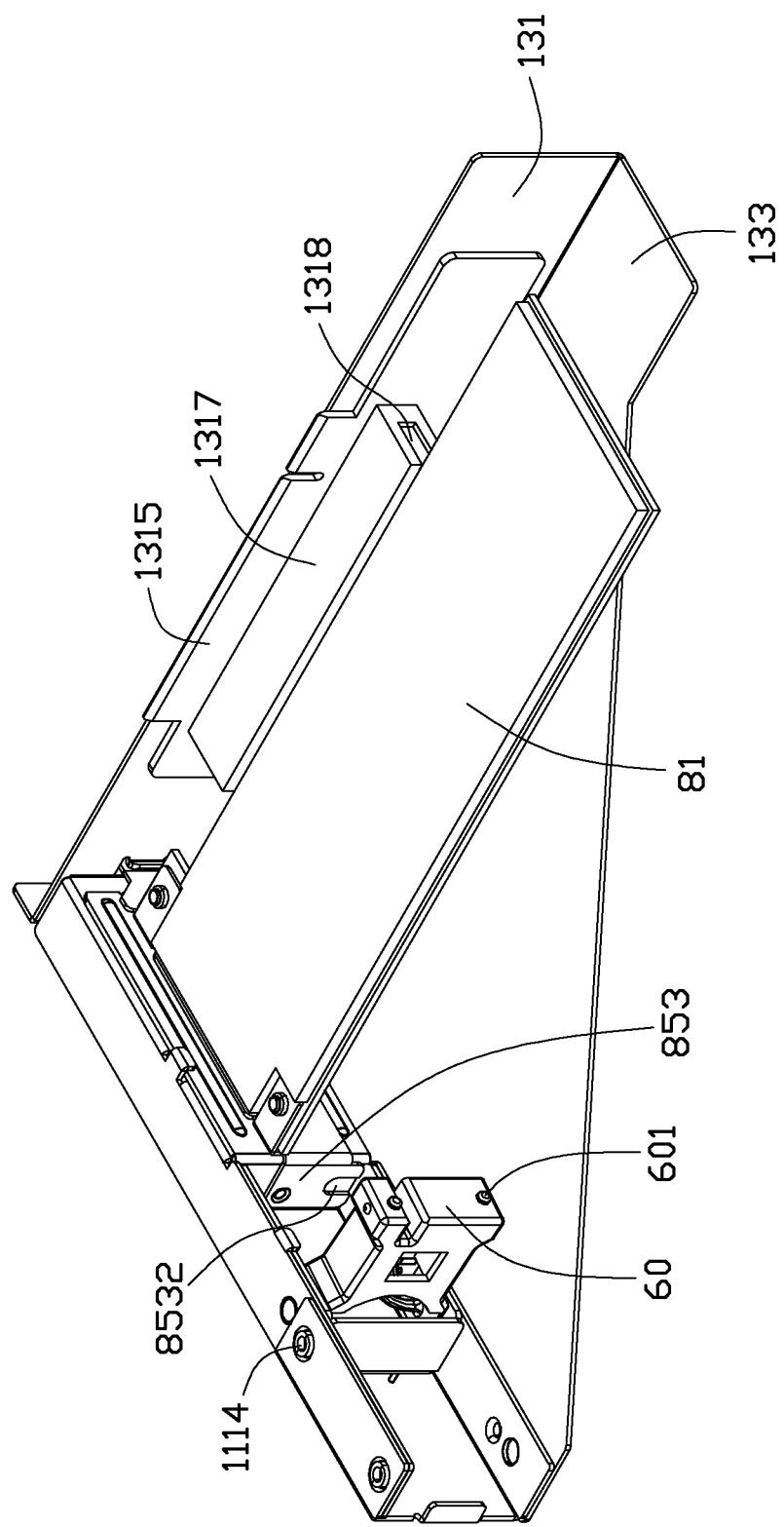
FIG. 9 is similar to FIG. 5, but showing the low profile PCI card of FIG. 8 being mounted to the card mounting apparatus.

Referring to FIG. 9, the procedure for mounting the low profile PCI card 80 on the low profile card mounting apparatus is similar to that for mounting the standard PCI card 70 on the standard profile card mounting apparatus. The main difference is that the second boss 601 of the fourth extending plate 60 extends into the groove 8532 and abuts the bent plate 853 of the slot cover 85 of the low profile PCI card 80.

Thus, the card mounting apparatus can be used to mount either the standard PCI card 70 card or the low profile PCI card 80, as required.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A card mounting apparatus for selectively mounting either of two different types of peripheral component interconnect (PCI) cards, the card mounting apparatus comprising:
    a bracket member defined an opening;
    a receiving member received in and movably engaged with the bracket member; and
    a latch body hingedly connected to the bracket member and the receiving member;
    wherein the receiving member is slidable in the bracket member to selectively change a length of the opening of the bracket member, and the latch body is correspondingly movable between a position in which the latch body is hingedly connected to one portion of the bracket member and another position in which the latch body is hingedly connected to another portion of the bracket member.

2. The card mounting apparatus of claim 1, wherein the bracket member includes a securing bracket, the securing bracket including two spaced and facing flanges, a connecting plate located between the two flanges with opposite ends thereof respectively adjoining front edges of the two flanges, wherein the flanges and the connecting plate cooperatively define the opening, and the receiving member is sandwiched between the two flanges and slidable along the flanges.

3. The card mounting apparatus of claim 2, wherein a baffling plate is located between the two flanges with opposite ends thereof adjoining rear ends of the two flanges, and wherein the baffling plate and the connecting plate are spaced along a transverse axis of the flange, the baffling plate are aligned with the opening and a slot along a longitudinal axis of the flange defined in the baffling plate.

4. The card mounting apparatus of claim 3, wherein the baffling plate is located at a side of the connecting plate and inner ends of the baffling plate and the connecting plate are spaced along the longitudinal axis of the flange.

5. The card mounting apparatus of claim 4, wherein the receiving member includes a receiving portion sandwiched between the flanges and slidable along the flanges, wherein the receiving portion abuts the connecting plate and the inner end of the baffling plate when the receiving portion covers a gap between the inner ends of the connecting plate and the baffling plate.

6. The card mounting apparatus of claim 5, wherein the receiving member further includes two spaced strips extending from a side of the receiving portion, fixed to the baffling plate with a gap defined therebetween, and the slot of the baffling plate communicates with a side of the gap between the strips to define an annular port.

7. The card mounting apparatus of claim 6, wherein the strips are slidable to change a length of the port.

8. The card mounting apparatus of claim 1, wherein the latch body is elastic and includes two hinge pins protruding from opposite ends thereof, and the two hinge pins extend through opposite portions of the receiving member and the bracket member to assemble the receiving member and the bracket member together.

9. The card mounting apparatus of claim 8, wherein the latch body includes two spaced and facing first extending plates, the two hinge pins are formed on outer surface of the first extending plates, respectively, and an operating portion is located between the two first extending plates and adjoins the two first extending plates.

10. The card mounting apparatus of claim 8, wherein the latch body includes two spaced and facing second extending plates located at a side of the two first extending plates, and two protruding nubs formed on outer surfaces of the two second extending plates to abut the receiving member.

11. The card mounting apparatus of claim 10, wherein the two first extending plates are aligned with each other, and the two second extending plates are aligned with each other, and the first extending plates are parallel to the second extending plates.

12. The card mounting apparatus of claim 11, wherein the latch body includes a third extending plate and a fourth extending plate connecting the two second extending plates, respectively, and wherein a first boss and a second boss protrude from outer surfaces of the third extending plate and the further extending plate, respectively to extend through and support the PCI cards, respectively.

13. The card mounting apparatus of claim 12, wherein the third extending plate and the fourth extending plate are parallel to and aligned with each other.

14. The card mounting apparatus of claim 2, wherein a limiting plate extends rearwards from an outer edge of the connecting plate to abut the receiving member.

15. The card mounting apparatus of claim 2, wherein the bracket member further comprises a supporting bracket comprising a first supporting plate abutting outside ends of the flanges and a second supporting plate abutting a bottom surface of one of the flanges.

16. The card mounting apparatus of claim 15, wherein a tab is formed on an inner surface of the first supporting plate to support the PCI card.

17. The card mounting apparatus of claim 15, wherein a sustaining portion with a through groove is mounted on an inner surface of the first supporting plate, and a part of the PCI card is received in the through groove.

18. The card mounting apparatus of claim 1, wherein the latch body is elastically deformable such that the latch body is movable between the position in which the latch body is hingedly connected to the one portion of the bracket member and the another position in which the latch body is hingedly connected to the another portion of the bracket member.

19. A card mounting apparatus for selectively mounting either of two different types of peripheral component interconnect (PCI) cards, the card mounting apparatus comprising:
 a bracket member comprising a securing bracket and a supporting bracket attached to the securing bracket, the securing bracket defined an opening;
 a receiving member engaged in the bracket member, the receiving member having a gap defined therein and being slidable in the bracket member between a first position in which the receiving member and the securing bracket cooperatively form a port corresponding to a first type of PCI card and a second position in which the receiving member and the securing bracket cooperatively form a port corresponding to a second type of PCI card; and
 a latch body hingedly connected to the receiving member and the securing bracket, the latch body detachable from its hinged connection to the securing bracket and movable in unison with the receiving member between the first position of the receiving member in which the latch body is hingedly connected to a first location of the securing bracket and the second position of the receiving member in which the latch body is hingedly connected to a second location of the securing bracket.

20. The card mounting apparatus of claim 19, wherein the latch body is rotatable relative to the receiving member between a position in which the latch body is received in the receiving member and a position in which the latch body is largely outside the receiving member and forms an angle with respect to the receiving member.

* * * * *